Oct. 16, 1928.
H. W. DAHLBERG
1,688,071
CYCLIC PROCESS OF USING BARIUM COMPOUNDS IN THE MANUFACTURE OF SUGAR
Filed Dec. 16, 1925
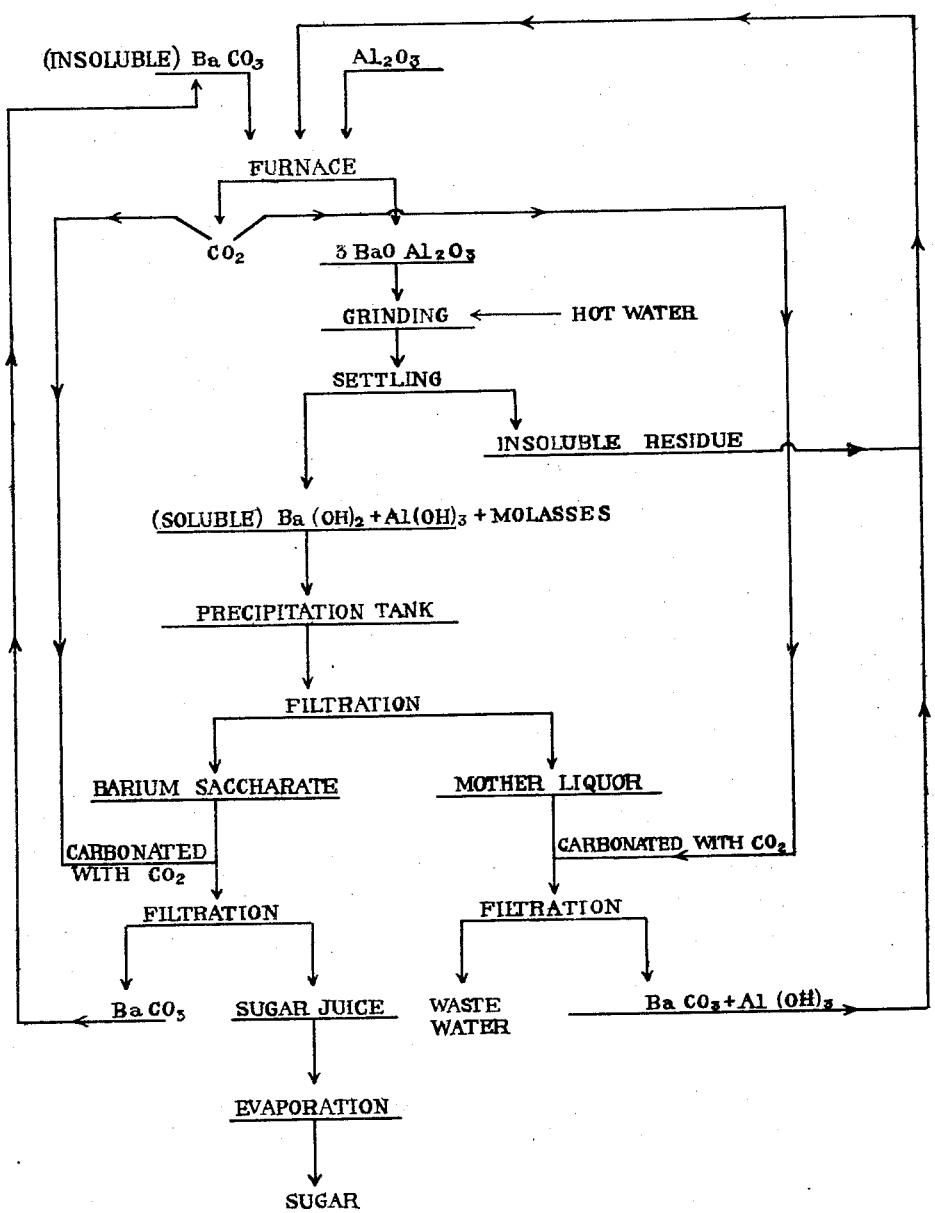

Patented Oct. 16, 1928.

1,688,071

UNITED STATES PATENT OFFICE.

HENRY W. DAHLBERG, OF DENVER, COLORADO.

CYCLIC PROCESS OF USING BARIUM COMPOUNDS IN THE MANUFACTURE OF SUGAR.

Application filed December 16, 1925. Serial No. 75,770.

This invention relates to a cyclic process of using barium materials, particularly compounds of barium and alumina, and is characterized by the conversion of barium compounds which are not soluble in water into water soluble compounds, followed by conversion back to insoluble compounds and subsequent reconversion to soluble barium materials.

The invention is particularly directed to a process involving the cyclic use of barium compounds in the recovery of sugar from molasses. When molasses, especially beet molasses, is treated with barium hydroxide the sugar contained in the molasses is precipitated as barium saccharate. According to the present invention, barium material which is not soluble in water, such as barium carbonate, is converted into soluble barytic material, such as barium and alumina compounds, particularly tribarium aluminate, from which barium hydroxide is obtained. Tribarium aluminate is employed because it provides a higher proportion of soluble BaO than most of the barium alumina compounds. The hydroxide is used to recover sugar from molasses as a saccharate, and the saccharate subsequently carbonated with carbon dioxide to form insoluble barium carbonate and sugar juice. The cycle is completed by returning the carbonate to the conversion step for changing it into water soluble compounds.

The details of the use of the process of the present invention are described and claimed in the following specification and claims. The steps of the process are illustrated schematically by the flow sheet on the accompanying drawing.

Referring in detail to the drawing the following procedure is outlined. Barium carbonate and hydrated alumina, such as bauxite, are mixed in the proper proportions to form, when burned, a barium alumina product having a substantial portion of the much desired soluble BaO and preferably the product tribarium aluminate $3BaO.Al_2O_3$. This furnace product contains approximately 82% BaO and 18% $Al_2O_3$, although these percentages are not inflexible. For example, a compound has been formed containing 81.85 per cent BaO and 18.15 $Al_2O_3$. A monobarium aluminate, as contrasted to the tribarium aluminate, may contain as little as 60 per cent BaO.

The alumina in the original mixture may be anhydrous alumina or in other form, as, for example, bauxite which also contains silica.

The mixture of barium carbonate and alumina should be reduced to a fineness of approximately 100 mesh and may then be introduced into the furnace preferably in the condition of a wet sludge. Any suitable furnace capable of withstanding a temperature of 1300 degrees to 1400 degrees C. will serve for the furnacing operation, but preferably a rotary kiln is used, such as may have a proper refractory lining, and preferably 100 to 150 feet long. The type of kiln used in the manufacture of Portland cement is satisfactory for the furnacing operation. The furnacing of the mixture is continued until the acidic content of the barytic material is volatilized and driven off and the conversion is as complete as desired.

The time required for the conversion of the mixture to a condition in which substantially all of the $CO_2$ from barium carbonate has been driven off and the barium aluminate formed, will vary from one to four hours with the temperature and length of the furnace or rotary kiln. The fuel used may be oil, gas powdered coal, or any convenient fuel capable of maintaining the desired temperature, and which will not appreciably contaminate the product with the products of combustion. The temperature should range from at least 1150° C. to at least 1400° C. to secure the most complete conversion.

The furnace product or clinker consists primarily of a barium aluminate compound with also some free barium oxide. If a relatively pure alumina is used, and also if the product be chiefly tribarium aluminate, the furnace product dissolves almost completely in hot water, leaving only a small insoluble residue. If bauxite be used as the alumina material, then the presence of silica may enlarge the proportion of insoluble matter. The compound tribarium aluminate may be identified by its properties, namely a melting point above 1600° C. It consists of weakly birefringent crystals having the refractive index 1.81.

During the furnacing carbon dioxide gas is driven off and is used for effecting the carbonating steps at two different locations during the subsequent steps of the process, as will be explained.

The product from the furnace or kiln is ground fine, and leached with either hot water or a barium hydroxide solution to form a barium solution containing at least ten per cent, and preferably more, BaO as barium hydroxide. The insoluble residue is led away and ultimately returned to the furnace for use in successive amounts to be furnaced. The soluble material thus comprises a mixture of $Ba(OH)_2 + Al(OH)_3$.

Inasmuch as in the precipitation of sugar from molasses it is desirable to use a barium hydroxide solution containing approximately 35% BaO, the above barium hydroxide solution is brought to this concentration by evaporation, or by crystallization, or both. If crystallization is used, a resulting weak solution may be enriched by adding to it barium hydroxide crystals from a preceding solution which has been brought to a concentration of 20% or more, and then cooled. Barium hydroxide is very soluble in hot solutions, and relatively insoluble in cold solutions.

Molasses is now treated with the barium hydroxide solution. Precipitation takes place, the barium combining with the sugar, and the barium saccharate is separated by filtration or otherwise from the mother liquor. These two materials each receive distinct treatments and some portion of each is returned to the furnace, as will be explained. The alumina content remains uncombined with the mother liquor.

The barium saccharate is now washed with water, after which it is carbonated with the carbon dioxide gas produced during the furnacing of the barium and alumina incident to the production of barium aluminate compound, or the gas may be separately manufactured as desired. This carbonation effects the decomposition of the saccharate into $BaCO_3$ and sugar juice. The barium carbonate ($BaCO_3$) is returned to the furnace to be converted from an insoluble barytic material to a water soluble material when the barium aluminate compound is formed. The sugar juice is evaporated and refined to the commercial grades of sugar.

The mother liquor, resulting from the treatment when barium saccharate is formed, after being separated from the saccharate is treated with a separate portion of the carbon dioxide gas obtained from the furnace. The resulting material is filtered and there is produced waste water and relatively solid material consisting of barium carbonate ($BaCO_3$) and alumina in the form of a hydroxide. These solid materials are returned to the furnace for continuation of the cyclic production of soluble barytic material.

Prior to introduction into the furnace the solids are mixed substantially as follows. A mixture is prepared including the barium carbonate from the saccharate, also the barium carbonate plus the aluminum hydroxide from the mother liquor, and also the insoluble residue remaining after the leaching of the furnace product. This mixture is then returned to the furnace or kiln and burned to form tribarium aluminate. The above cycle may be repeated indefinitely. During the process small losses of barium are almost inevitable and such losses are made up by adding small amounts of fresh barium carbonate to the mixture fed to the furnace, according as conditions dictate in order to approximate substantially molecular proportions. Practically, the addition of small amounts of barium carbonate from time to time will satisfy the requirements even though the tribarium aluminate or other barium aluminate compound of the furnace product may as result provide a slight excess of (BaO) barium oxide or monobarium aluminate.

Fresh barium needed to make up losses may be produced in a separate furnace by converting the cheap barium sulphate into a barium aluminate compound, preferably tri-barium aluminate, following the steps of the process outlined hereinbefore for the production of the tribarium aluminate and substituting the sulphate for the carbonate.

From the foregoing it will be noted that this cyclic process provides for a return to the furnace of the insoluble residue where it is mixed with new barium compounds likewise insoluble in water and finally converted by furnacing into a barium compound a useful portion of which is soluble. It will further be noted that this cyclic process provides for the return to the furnace of the insoluble barium carbonate produced after barium saccharate has been decomposed to produce the sugar juice. The third cyclic phase of the process is the return of the barium carbonate and aluminum hydroxide remaining after the mother liquor has been carbonated so as to separate the solids from the waste water, and this barium carbonate and aluminum hydroxide are likewise returned to the furnace to complete their cycle.

What I claim is:—

1. The cyclic process of manufacturing sugar and using barium as an extractive agent, which process consists in converting barytic materials which are insoluble in water into water soluble barytic materials by heating insoluble barytic material with alumina and thereby producing a barium aluminate compound containing water soluble barytic material, utilizing the water soluble content of said barium aluminate compound to treat molasses and thereby producing a barium saccharate, separating the barytic content from the sugar content as a water insoluble material, and reusing said water insoluble material in producing a water soluble barium aluminate compound.

2. The cyclic process of manufacturing sugar and using barium as an extractive agent, which process consists in converting barytic materials which are insoluble in water into water soluble barytic materials by heating insoluble barytic material with alumina and thereby producing tribarium aluminate, utilizing the water soluble content of said tribarium aluminate to treat molasses and thereby producing a barium saccharate, separating the barytic content from the sugar content as a water insoluble material, and reusing said water insoluble material in producing tribarium aluminate.

3. The cyclic process of manufacturing sugar and using barium as an extractive agent, which process consists in converting water insoluble barium carbonate and alumina into water soluble barytic material by heating the carbonate in a furnace and thereby driving off carbon dioxide, using said water soluble barytic material to extract sugar from molasses as a barium saccharate, decomposing the barium saccharate into barium carbonate and a sugar juice by means of said carbon dioxide driven off from said furnace, returning said barium carbonate and alumina to said furnace and heating the same and driving off carbon dioxide used in said decomposing step.

4. The cyclic process of manufacturing sugar and using barium as an extractive agent, which process consists in converting water insoluble barium compounds combined with acidic oxides capable of being volatilized into water soluble barytic materials by heating such barytic compounds with alumina in a furnace and thereby driving off carbon dioxide, using said water soluble barytic material to extract sugar from molasses as a barium saccharate, decomposing the barium saccharate into barium carbonate and the sugar juice by means of said carbon dioxide driven off from said furnace, returning said barium carbonate and alumina to said furnace, and heating the same and driving off carbon dioxide to be used in said decomposing step.

5. The cyclic process of manufacturing sugar and using barium as an extractive agent, which process consists in converting water insoluble barium compounds combined with acidic oxides capable of being volatilized together with alumina into water soluble barytic materials by heating such barytic compounds and alumina in a furnace and thereby driving off the volatilizable acidic content and producing water soluble barytic material, using said water soluble barytic material to extract sugar from molasses as a barium saccharate, decomposing the barium saccharate into a water insoluble barium compound combined with an acidic oxide capable of being volatilized by treating the saccharate with the gas driven off from the furnacing of said original barytic material, returning said water insoluble barytic material and said alumina to said furnace, and heating the same and driving off the volatilizable acidic content as a gas to be used in said decomposing step.

6. The cyclic process of using barium as an extractive agent in the manufacture of sugar, which process consists of mixing water insoluble barium carbonate and alumina, heat treating said mixture in a furnace and thereby converting said insoluble barytic material into water soluble barytic material, preparing barium hydroxide from said barytic material, treating molasses with said barium hydroxide, and thereby forming barium saccharate and a mother liquor, treating said saccharate with carbon dioxide and producing water insoluble barium carbonate and a sugar juice, treating said mother liquor with carbon dioxide and producing water insoluble barium carbonate and aluminum hydroxide, returning to said furnace both said barium carbonate obtained from said saccharate and also said barium carbonate with said aluminum hydroxide obtained from said mother liquor, and finally heating the materials thus returned to the furnace and producing water soluble barytic material.

7. The cyclic process of using barium as an extractive agent in the manufacture of sugar, which process consists of mixing water insoluble barium carbonate and alumina, heat treating said mixture in the furnace, and thereby converting said insoluble barytic material into a barium aluminate compound containing water soluble barytic material, preparing barium hydroxide from said barium aluminate compound, treating molasses with said barium hydroxide and thereby forming barium saccharate and a mother liquor, treating said saccharate with carbon dioxide and producing water insoluble barium carbonate and sugar juice, treating said mother liquor with carbon dioxide and producing water insoluble barium carbonate and alumina, returning to said furnace both said barium carbonate obtained from said saccharate and also said barium carbonate with said alumina obtained from said mother liquor, and finally heating the materials thus returned to the furnace and producing water soluble barytic material in said barium aluminate compound.

8. The cyclic process of using barium as an extractive agent in the manufacture of sugar, which process consists of mixing water insoluble barium carbonate and alumina, heat treating said mixture in the furnace, and thereby converting said insoluble barytic material into tribarium aluminate, preparing barium hydroxide from said tribarium aluminate, treating molasses with said barium hydroxide and thereby forming barium saccharate and a mother liquor, treating said saccharate with carbon dioxide and producing water insoluble barium carbonate and sugar juice, treating said mother liquor with carbon dioxide and producing water insoluble barium carbonate and alumina, returning to said furnace both said barium carbonate obtained from said saccharate and also said barium carbonate with said alumina obtained from said mother liquor, and finally heating the materials thus returned to the furnace and producing water soluble barytic material in said tribarium aluminate.

In testimony whereof I affix my signature.

HENRY W. DAHLBERG.